United States Patent [19]

Hyde et al.

[11] 4,390,284

[45] Jun. 28, 1983

[54] METHOD AND APPARATUS FOR WETTING POWDER

[75] Inventors: Paul E. Hyde, Corvallis; John A. Rowell, Albany, both of Oreg.

[73] Assignee: Neptune Microfloc, Inc., Corvallis, Oreg.

[21] Appl. No.: 115,295

[22] Filed: Jan. 25, 1980

[51] Int. Cl.³ .............................................. B01F 5/20
[52] U.S. Cl. ................................. 366/165; 118/303; 366/40
[58] Field of Search ................ 366/9, 10, 11, 40, 167, 366/173, 142, 315, 107, 101, 172, 139, 138, 165, 150, 154, 166, 174, 177; 239/402, 403, 427.3, 430, 431; 118/303, 24

[56] References Cited

U.S. PATENT DOCUMENTS

| | | | |
|---|---|---|---|
| 45,369 | 12/1864 | Maitland | 366/173 |
| 185,702 | 12/1876 | Schafhaus . | |
| 563,978 | 7/1896 | Meinshausen | 366/173 |
| 872,729 | 12/1907 | Hiller | 366/9 |
| 1,405,707 | 2/1922 | Beers | 366/9 |
| 1,574,210 | 2/1926 | Spaulding | 366/173 |
| 1,980,499 | 11/1934 | Pfaff | 239/543 |
| 2,071,846 | 2/1937 | Lamb | 366/173 |
| 2,520,957 | 9/1950 | Peterson | 366/139 |
| 2,528,514 | 11/1950 | Harvey | 366/173 |
| 2,653,801 | 9/1953 | Fontein | 366/165 |
| 2,768,559 | 10/1956 | Krogel | 366/167 |
| 2,863,651 | 12/1958 | McBride | 366/19 |
| 3,047,275 | 7/1962 | Cox | 366/101 |
| 3,251,583 | 5/1966 | Mason | 366/10 |
| 3,298,669 | 1/1967 | Zingg | 366/107 |
| 3,300,094 | 1/1967 | Rockola | 366/101 |
| 3,697,052 | 10/1972 | Andris | 366/142 |
| 3,740,027 | 6/1973 | Kormos | 366/172 |
| 3,809,436 | 5/1974 | Ciaffone | 366/101 |
| 3,871,627 | 3/1975 | Marshall | 366/173 |
| 3,879,021 | 4/1975 | Riley | 366/173 |
| 3,926,787 | 12/1975 | Gay | 366/173 |
| 3,986,706 | 10/1976 | Giombini | 366/315 |
| 4,007,921 | 2/1977 | Zingg | 366/10 |
| 4,086,663 | 4/1978 | Croft | 366/173 |
| 4,323,314 | 4/1982 | Kaiser-Wirz | 366/167 |

FOREIGN PATENT DOCUMENTS

| | | |
|---|---|---|
| 864000 | 2/1971 | Canada . |
| 1015332 | 9/1977 | Canada . |
| 928570 | 3/1959 | United Kingdom . |
| 1006723 | 12/1961 | United Kingdom . |
| 1084385 | 7/1964 | United Kingdom . |
| 1470187 | 4/1973 | United Kingdom . |
| 1544304 | 1/1976 | United Kingdom . |
| 2020988 | 5/1978 | United Kingdom . |

*Primary Examiner*—Robert W. Jenkins
*Attorney, Agent, or Firm*—Klarquist, Sparkman, Campbell, Leigh, Whinston & Dellett

[57] ABSTRACT

A high kinetic energy water spraying apparatus wets powdered or granular dry material, particularly hard-to-wet polymers, to provide a lump-free solution of a controlled concentration. A volumetric feeder drops the dry material through a fructoconical upper portion of the apparatus. Water is injected tangentially so that the inner surface of the upper portion is completely wetted to prevent buildup of dry material on the surface.

A lower portion of the apparatus comprises a cylindrical column which receives dry material from the upper portion. The inner surface of the column includes a series of spray nozzles positioned to produce downwardly sloped and radially inwardly oriented jets of liquid which impinge falling dry material with high energy. The downward slope of the jets creates a downward air flow so that any dust from the dry material is drawn downwardly into the column.

16 Claims, 16 Drawing Figures

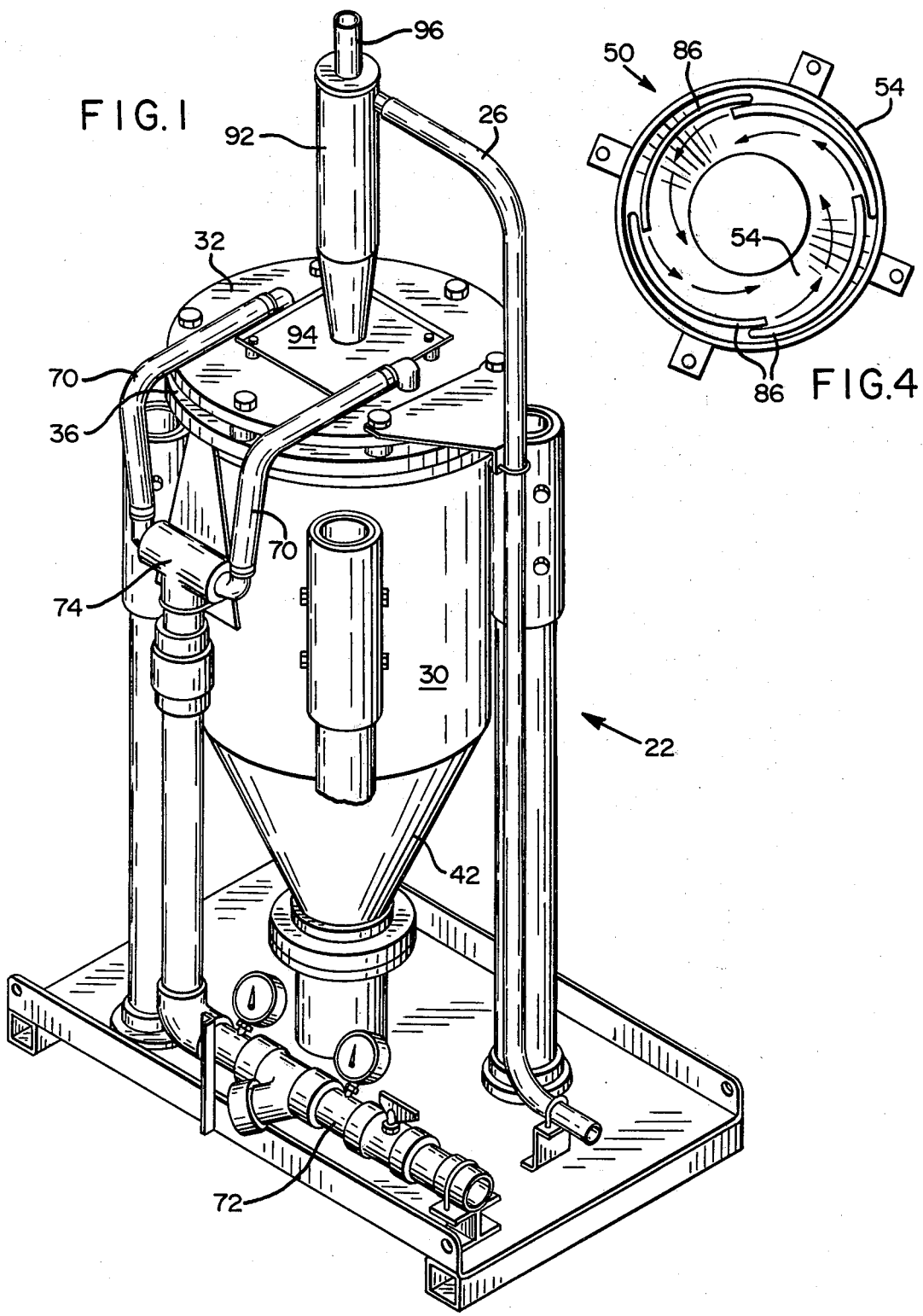

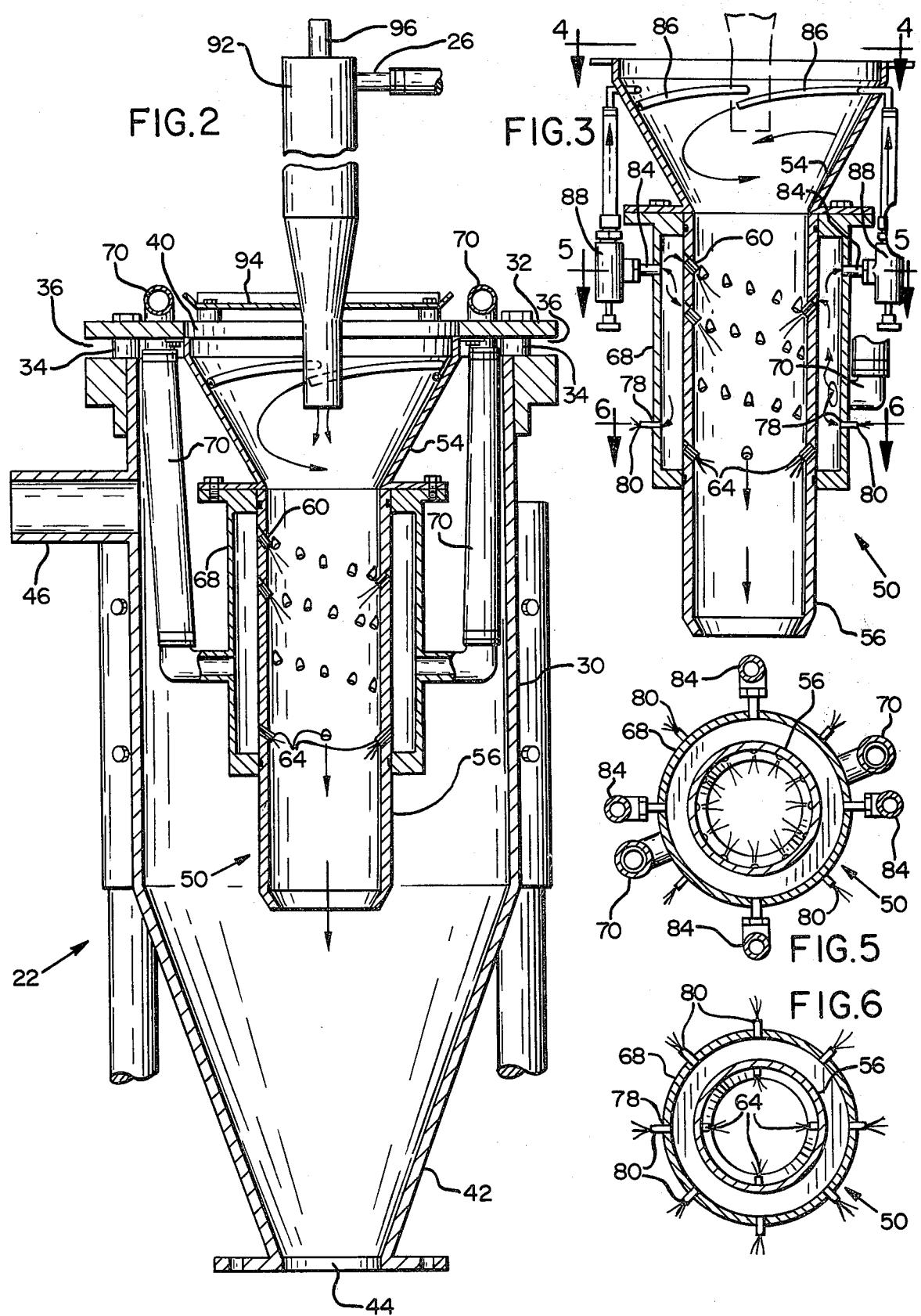

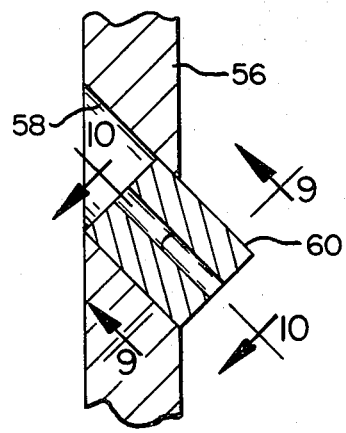
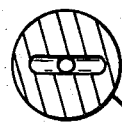
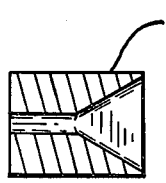
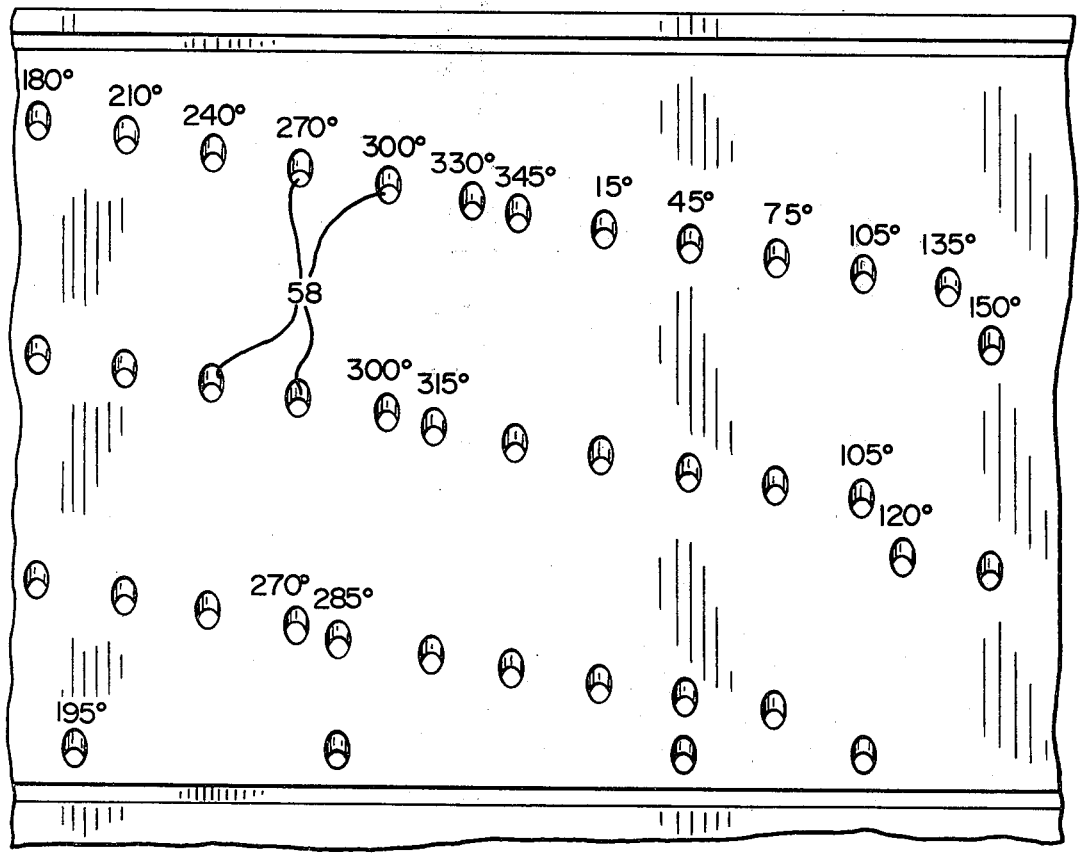

METHOD AND APPARATUS FOR WETTING POWDER

BACKGROUND OF THE INVENTION

The present invention relates to devices for wetting dry particles with a liquid. More specifically the invention relates to an apparatus which is particularly suitable for wetting dry powdered or granulated polymer with water to obtain lump free solutions of polymer.

For industrial purposes, it is frequently necessary to rapidly combine streams of liquids and solids to form solutions on a continuous basis. For example, homogenous solutions containing viscosity enhancing polymers must be supplied at a high rate to oil well drilling rigs where they are employed to facilitate the drilling process. The problems of and requirements for continuously forming uniform solutions by mixing powdered or granulated solids with liquids have thus been researched extensively. But, no suitable means for wetting hard-to-wet materials, such as certain polymers, has heretofore been discovered.

It has been particularly difficult to devise a wetting apparatus sufficiently compact to be used at a remote and/or crowded site such as an off-shore drilling platform.

Furthermore, it has not been possible to continuously form high-quality solutions of hard-to-wet dry materials without releasing substantial amounts of dust into the atmosphere as an airborne pollutant. The escape of dust is particularly undesirable because airborne dust forms a film on walking surfaces around the wetting device. Such dust, e.g. polymer dust, is extremely slippery when wet and thus is a safety hazard to workers.

As in all installations where finely divided material is handled, the escape of airborne particulate material should be minimized to avoid potential combustion.

Also, if a wetting apparatus is to be used in the presence of combustible gases, it must be free of ignition sources.

One of the difficulties of forming solutions from hard-to-wet powders or granules is that the powder tends to form small lumps. In most traditional mixing devices, such lumps become wetted before they break up into individual particles. The wetted surface of a lump becomes an impermeable film which hinders break up of the lump. Thus, lumps are carried through the mixer with powder inside remaining substantially dry and unmixed with liquid. Such lumping problems are especially troublesome when the powder comprises dry polymers. It is, however, a problem in wetting carbon dust and a number of other types of materials.

Another problem of typical wetting systems is that fine particles of dust from the powder become airborne and drift onto interior surfaces of the wetting apparatus. When such surfaces are moist but not washed, a wet paste builds up to plug passages of the apparatus or to form large, indivisible lumps which fall into the solutions.

A variety of devices have included features to deal with one or more of the above problems. But, heretofore, no apparatus has been devised which can successfully mix hard-to-wet powders, such as polymers, or successfully manage the dusting problems which result when such powders are dissolved on a continuous basis.

U.S. Pat. No. 1,980,499 to Pfaff, shows a dust quencher for water gas apparatus. Such a device could not be successfully used to form a solution containing hard-to-wet powders due to an inadequate array of nozzles and the presence of numerous unwashed surfaces which would encourage powder buildup.

Similarly, the spray apparatus described by C. P. Lamb et al, in U.S. Pat. No. 2,071,846, could not adequately wet hard-to-wet powders or prevent internal buildups of dust lumps.

U.S. Pat. No. 2,528,514 to Harvey et al shows a conical mixing vessel into which phosphoric acid is injected through peripheral inlets. Although the lower conical surfaces of this apparatus would be washed, a substantial dusting problem would remain. Furthermore, the simple vortical mixing illustrated would create a substantial lumping problem if used to wet a hard-to-wet powder such as polymer.

A wide variety of other devices have been constructed to facilitate the contact of liquids and solids. But none is adequate for mixing hard-to-wet powders such as polymers.

SUMMARY OF THE INVENTION

It has now been discovered that a compact device for mixing liquids and hard-to-wet particulate solids can be constructed and can efficiently form solutions containing up to 2.0 percent or more of the particulate material. This is accomplished by providing a wetting apparatus having a substantially vertical and unobstructed wetting column defined by a generally cylindrical wall. Nozzles extend through the wall and face radially inwardly and downwardly so that liquid sprayed into the column moves downwardly at a rate greater than the rate induced by gravitational acceleration. These downwardly aimed nozzles induce a downwardly moving airstream through the center of the column so that a region of low pressure is produced above the nozzles.

Each nozzle is radially inwardly oriented to produce a downwardly angled fan-shaped spray pattern with its longest cross-sectional dimension substantially transverse to the longitudinal axis of the column. The nozzles are arranged in a vertically stepped array so that jets of liquid from opposed nozzles impinge at a location outwardly of the column's central axis.

Powdered or granular material falling through the column is thoroughly wetted as it is impinged upon by numerous, successive high energy jets of liquid. Some lumps of particulate material not be completely broken by initial contact with a jet. Any such unbroken lumps are carried by the jet to a line of intersection where a differently directed jet from an opposed nozzle shears the lump by impact and by rapidly changing its direction so that the lump is disintegrated.

Extending upwardly from the column is a frustoconical funnel which provides a wide receptacle for receiving the dry material to be wetted. Powder is delivered to the column at a location within the frustoconical element from a hopper which may be located either remotely from the wetting apparatus immediately above the apparatus, or beside the apparatus. The powder falls through the funnel and into the column, preferably with no substantial contact between dry material and liquid inside the funnel.

Streams of liquid entering tangentially near the top of the funnel are directed to form a sheet of liquid which vortically washes inner surfaces of the funnel and upper regions of the column including the uppermost nozzles thereby to prevent sticking of dry material to those members. All interior surfaces are continuously washed so that any unwetted material which approaches the wall is immediately wetted and carried downwardly to the outlet of the column.

The previously described down draft and region of low pressure extend into the funnel so that any dust from dry material entering the funnel is drawn into the region of low pressure air inflow. Such dust can not escape upwardly, but is drawn by the induced draft downwardly through the column. In addition, the entire wetting apparatus is contained within a housing which prevents the escape of dust particles into the surrounding atmosphere.

Since the entire operation is conducted in a closed area and because dust particles are automatically drawn into the column where they are wetted, the escape of dust is minimized.

Accordingly, it is the object of the invention to provide an apparatus which will thoroughly wet even hard-to-wet powdered or granular materials to form a homogenous solution in a continuous process.

More specifically, it is an object to form such a solution which is lump free and which can have a concentration of up to 2.0 percent or more of the wetted material.

A further object is to provide an apparatus for wetting such materials wherein substantially no wetted, but unwashed, surfaces are accessible to airborne powders so that there are no sites for the buildup of lumps on surfaces of the apparatus where buildup would present a problem.

A further object is to provide such an apparatus which includes no electrical or other equipment which might ignite combustible gases.

Various other objects and advantages of this invention will be apparent to those skilled in the art from the following description.

BRIEF DESCRIPTION OF THE DRAWINGS

In the drawings:

FIG. 1 is a perspective view showing the exterior of an apparatus for continuously wetting a powdered or granulated material to form a solution;

FIG. 2 is an elevational view of the apparatus shown in FIG. 1 with portions of the apparatus shown in cross-sections to disclose internal structure;

FIG. 3 is a vertical sectional view of the mixing column shown in FIG. 2 partially rotated;

FIG. 4 is a plan view taken along line 4—4 of FIG. 3;

FIG. 5 is a sectional view taken along line 5—5 of FIG. 3;

FIG. 6 is a sectional view taken along line 6—6 of FIG. 3;

FIG. 7 is an enlarged projectional view showing the exterior of the mixing column illustrated in FIG. 2 as on a flat surface and with the nozzles removed;

FIG. 8 is an enlarged partial sectional view showing a nozzle of the type illustrated in FIG. 1;

FIG. 9 is a sectional view taken along line 9—9 of FIG. 8;

FIG. 10 is a sectional view taken along 10—10 of FIG. 8;

DESCRIPTION OF PREFERRED EMBODIMENTS

Figure 11:
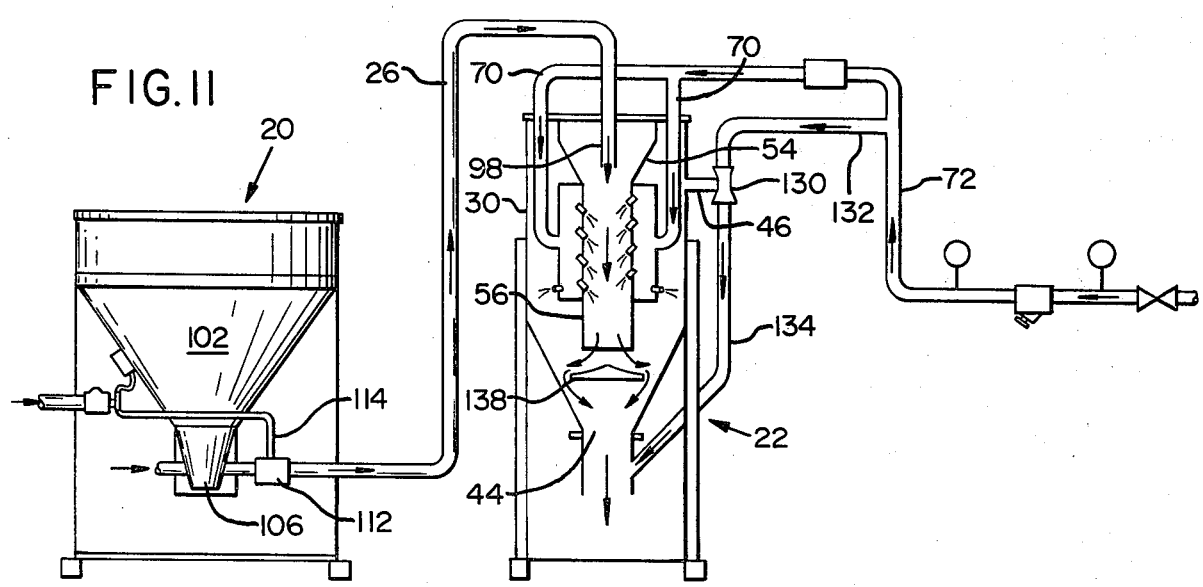
FIG. 11 is a schematic representation of apparatus of claim 1 connected to a remote hopper for feeding powdered or granular material to the interior of the mixing column.

The apparatus and methods of the present invention are best understood with reference to the drawings. FIG. 11 illustrates schematically a first embodiment of the invention which includes a hopper mechanism 20 positioned at a location remote from a wetting unit 22. A powder or granule delivery line 26 connects the hopper mechanism 20 and wetting unit 22 for delivering a flow of polymer granules from the hopper 20 to the wetting unit 22. For the purpose of discussion, this description will refer to polymer as the solid material being wetted. It is to be understood, however, that any similar powdered or granular material can be wetted and formed into a solution using apparatus according to the present invention. Also, the apparatus is not only suitable for forming solutions of hard-to-wet powders and granulated materials, such as polymers, but also is capable of efficiently forming solutions and mixtures of more easily wetted materials.

The wetting unit 22 is best understood with reference to FIGS. 1-10. From these figures it will be seen that the unit includes a generally tubular body 30 made of fiberglass or other suitable material. The body is closed at its uppermost end by an end plate 32 spaced a short distance away from the end of the body 30 by spacers 34 so that an annular air outlet slot 36 is formed between the body 30 and the end plate 32. Centered in the end plate 32 is an inlet port 40. The bottom of the body 30 tapers to form a funnel portion 42 which terminates in a solution outlet 44 defined by the lower end of the body. An auxilliary air outlet 46 may be provided at some position between the ends of the body 30 for purposes which will be described below.

Depending from the end plate 32 is a wetter assembly 50 which is shown in greater detail in FIG. 2 and, partially rotated, in FIG. 3. This assembly includes an upper section which is a frustoconical bowl or funnel 54 having its mouth secured to the end plate 32. A cylindrical wetting column 56 extends downwardly from the funnel 54 so that the interior of the funnel 54 and column 56 connect. The column and funnel are arranged vertically so that material falling through the funnel will subsequently fall straight through to the bottom of the column 56 by gravity and induced draft.

The column 56 includes a plurality of radial openings 58 adapted to receive nozzles 60. The nozzles 60 are arranged in a stepped array, specifically the generally helical configuration illustrated in FIG. 7. Most preferably the nozzles will be shaped to produce fan-shaped jets of liquid as illustrated in FIG. 10. Each nozzle will be mounted as shown in FIG. 8 at a downward angle of about 45° from vertical in position so that the plane of the fan-shaped jet is bisected by a vertical plane through the axis of the column 56.

It is significant that the stepped arrangement shown positions the nozzles so that they produce fan-shaped spray patterns which intersect no more than one other spray pattern along any given line of intersection. All the nozzles in the helical pattern of FIG. 7 will produce fan-shaped jets which extend through the central axis of the column 56 but, due to their stepped vertical separation, none of the spray patterns intersect at the central axis. Instead, a helical array of two-jet intersections extends vertically through the column.

Each such intersection is between an upper or carrying jet and a lower or shearing jet. One or more shearing jets may intersect each carrying jet, but multiple shearing jets should not intersect a carrying jet along a single line of intersection. Carrying and shearing jets need not be exactly diametrically opposed. In the preferred arrangement illustrated in FIG. 7, most of the carrying and shearing jet pairs are circumferentially offset by fifteen degrees from direct opposition.

A collision of multiple jets at a single location in the column 56 might cause water to splash upwardly and mix with dry polymer floating in the air. Such a condition could result in the formation of jelly-like stalagtites which eventually would fall through the column 56 and form lumps in the resulting solution. It is thus beneficial to select the nozzles and nozzle placement so that an intersection of multiple spray jets does not occur in the upper portions of the column 56.

Furthermore, the kinetic energy of multiple jets would be substantially dissipated if several such jets intersected at the same location. Because all intersection lines involve a maximum of two jets, the full benefit of kinetic energy in the jets is utilized.

If, for example, a number of jets were all directed toward the same point on the axis of the central column, a lump carried radially inwardly, horizontal motions of lumps would virtually stop at the central axis. Lumps would tend to congregate at the central axis and then move straight downwardly to the outlet. This is because the forces of multiple diametrically opposed jets would cancel each other out.

With the present invention, a lump carried by a first jet passes beyond the central axis until it encounters a second, opposed jet at an angle to the first. This second jet shears the lump thereby disintegrating it while still in the column. Such shearing is repeated as material moves downwardly in the column through multiple jet intersections.

Thus, a helical nozzle array or some other related, stepped array optimizes usage of energy in the water jets by minimizing energy dissipation. A helical array is exceptionally efficient as it can produce the most possible two-jet intersections in the least vertical distance.

The array is selected so that each intersection is farther from the nozzle which produces the first or carrying jet than it is from the nozzle producing the second or shearing jet. Thus, shearing jets impact with maximum kinetic energy to disintegrate carried lumps and their contents. With a helical array of nozzles at a downward slope of 45°, substantially opposed nozzles will produce jets which intersect at a location offset from the central axis, in the direction of the lower nozzle, by a distance about fifty percent of the vertical distance between the two opposed nozzles.

In some instances, it may be desirable to use a pattern of nozzles with jets which do not intersect.

A helical array would still be preferred as the most compact possible arrangement of jets. Non-intersecting jets would be obtained by narrowing the jet angle, decreasing the column diameter and/or increasing the pitch of the helix.

In addition to its compactness, a helix is preferred because it improves wetting by increasing the residence time of solute material in the column. This occurs because the jets continuously impart horizontal motion to material inside the column so that material travels in a helical path either through the column or along the column wall depending on the specific nozzle placement. The helical pattern further aids in wetting by dispensing material uniformly outwardly from the central axis,, rather than congregate it at the center or in one area of the side wall.

To avoid the possibility of dry material passing through the column unwetted, the nozzles 60 should be arranged circumferentially so that the jets allow no straight line vertical air passageways through the column. A helical arrangement should make at least three revolutions so that material to be wetted falls through multiple jets and has an opportunity to be sheared at multiple jet intersections. In such a helical jet pattern with no vertical air passages, solid material moves downwardly in a zig-zag pattern, having multiple opportunities for contact, impact and shearing by jets of liquid. A twisting movement and turbulence imparted by the helically arranged, high-energy jets, insures that there is uniform mixing of liquid and wetted solid material.

Because the nozzles are aimed downwardly, the jets of liquid tend to induce a negative pressure in the funnel 54 and the top of column 56. As a result, air and particulate material in the funnel 54 are drawn into and downwardly through the column 56 by suction.

The draw or suction of the column is determined by the angle of jet divergence, the downward angle of the jets and velocity of the jets. The angle of divergence may be from 15° to 95° for a cylindrical column. Dust entrapment inside the column improves, but suction decreases as the angle of divergence is increased.

The divergence of the spray jet fan is established within the above range by taking into consideration the material to be wetted. Granulated material can typically be wetted with no dusting problems using jets with relatively narrow divergence. Hard-to-wet powders, such as certain polymers, are best wetted with wide jets to maximize powder contact and dust entrapment.

The nozzles should all have the same downward slope, the slope being between 30° and 60° from vertical, with good results being obtained at about 45°. If the nozzles produce jets that are too flat, they will not create an adequate down draft. If too steep, much of the kinetic energy of the jets will be dissipated due to the long length of the jets and thus wasted.

For adequate shearing and impact without excessive misting, the apparatus should be constructed to deliver liquid through the nozzles at a velocity of thirty to seventy-five feet per second.

In addition to the nozzles arranged as shown in FIG. 7, four more nozzles 64 can be positioned below the nozzles 60. The nozzles 64 are located to produce jets directed inwardly and, preferably, sloped level to downwardly. The individual nozzles 64 may conveniently have the same slope as the nozzles 60.

The nozzle 64 act as scavengers to wet any powder which escapes wetting by the nozzles 60. Accordingly, the nozzles 64 should be selected to produce a wide, fan-shaped spray pattern of 90°-95°. When placed as described and illustrated, these nozzles will produce jets which intersect to provide a sheet of liquid extending across substantially the entire cross-sectional area of the column. Such an arrangement insures that there are no straight passageways devoid of liquid through which dry material can travel through the wetting apparatus.

Water is supplied to the nozzles by means of a cylindrical distribution manifold 58 which forms a watertight chamber encompassing the outer ends of the nozzles 60, 64. Water is supplied to the manifold 68 through feeder lines 70 which extend through the end plate 32 and connect to a water supply line 72 by a T-fitting 74.

Radially extending openings 78 may be provided through the manifold 68 to receive outwardly facing spray nozzles 80 which may be aimed to produce spray patterns which are substantially horizontal or angled downwardly. Such nozzles are used for washing the inner surface of the funnel portion 42 so that no stray dust particles will adhere to the inside of the body 30.

Also communicating with the interior of the manifold 62 are wash lines 84 connected to tangential stainless steel tubes 86 which comprise short segments of a descending spiral. Water is injected into the tubes at their uppermost ends; and the bottom end of each tube is open so that a vortical flow of liquid washes over the interior surface of the funnel 54 producing a flow of liquid which completely washes the interior surface of the funnel 54 in the flow pattern illustrated in FIG. 4. Flow control devices 88 may be provided in the lines 84 to regulate the flow of liquid through the vortex tubes 86 in relation to the flow of liquid through the nozzles 60.

As previously mentioned, polymer may be delivered to the interior of the column 56 via a delivery line 26. In the apparatus illustrated in FIGS. 1-3, the delivery line 26 connects to a cyclone 92 mounted to the top of the end plate 32 by a cyclone footing 94. The cyclone 92 extends through the inlet port 40 so that polymer descending through the cyclone 92 is deposited well inside the wetting funnel 54. A cyclone outlet 96 is provided to allow the escape of conveying air as will be explained below.

There are a number of alternative ways to deliver powder to the wetting funnel 54. For example, the powder may be delivered through a more simple hose or pipe which extends to the center of the funnel 54 as shown in FIG. 11 at 98. As another option a screw feed apparatus could be used to deliver the powder. Or, as hereinafter described in reference to FIGS. 15 and 16, a rotary feeder could be used.

The polymer to be delivered through the delivery line 26 may be supplied from a feed hopper 20 as shown in FIGS. 11 and 12. The hopper includes a conical bin 102 which opens upwardly to receive powdered material from sacks or other containers. Material funnels downwardly and is received in a powder pick-up chamber 106 located at the base of the bin 102. Means are provided for continuously removing the polymer from the chamber 106 and injecting it into the line 26 whereby the polymer is conveyed into the wetting unit 22.

Powder is conveyed out of the chamber 106 through a suction head 108 which is the terminus of a tube 110. A negative pressure is created in the tube 110 by means of an eductor 112 located downstream of the head 108. High pressure air supplied to the eductor 112 through a line 114 induces suction to pull polymer out of the chamber 106 and inject it into the delivery line 26. As shown in FIG. 12, a portion of the delivery tube 26 may be coiled in a reel. Although a vertical reel is illustrated, a horizontal reel would be preferred so that no moisture could collect in low portions of loops in the line 26 and pulsations of powder would be minimized.

Referring specifically to FIGS. 13 and 14 it can be seen that the suction head 108 includes an overlying portion 118 which serves as a hood to prevent the weight of polymer inside the bin 102 from blocking the inlet opening of the tube 110. Polymer continuously flows around the overlying portion 118 in a stream so that it may be continuously removed through the suction head 108.

A source of air is required to mix with polymer inside the pick-up chamber 106 prior to conveyance. This is supplied from the atmosphere through a threaded pipe 120 which is axially in line with the tube 110 and extends radially through the opposite side of the chamber 106. The spacing between the inner ends of the tube 110 and pipe 120 can be regulated by rotating the pipe 120 to move it radially of the chamber 106. Moving the pipe 120 in or out will alter the rate at which powder is removed from the chamber 106.

As shown in FIG. 12, the feed hopper 20 is provided with a screen 124 to prevent the entry of foreign material with the influent polymer and a lid 126 to close the feed hopper 20 except when the hopper is being loaded.

Dry powdered or granular material, such polymer is gravity fed from the feed hopper 20 into the pick-up chamber 106 as previously described. In the chamber 106 polymer is mixed with air and drawn by means of the eductor 112 into the line 26 whereby it is conveyed into the funnel 54 of the wetting unit 22. During travel to the wetting unit, the polymer passes through the cyclone 92 wherein excess conveying air is separated from the polymer and vented or recycled through the line 96 to the air supply line 114 or pipe 120 to avoid the discharge of any dust particles.

Polymer injected into the funnel 54 is not wetted therein, but falls directly downwardly by gravity and induced draft through the unobstructed column 56. As it is drawn through the column, the polymer encounters the multiple, horizontally-oriented, fanshaped jets of liquid produced by the nozzles 60. Since the nozzles are aimed downwardly, air, liquid and polymer are accelerated toward the outlet of the column 56.

Any lumps of polymer moving through the column 56 encounter at least one of the liquid jets. The jet impacts and thereby disintegrates the lump. Even if the initial impact is insufficient to cause the total disintegration, the desired result is achieved when the lump is carried to an intersection where its disintegration is completed by a shearing jet.

Any polymer remaining unwetted after passing the jets produced by nozzles 60 is wetted by the scavenging jets produced through the nozzles 64. A solution containing the dissolved polymer flows out the bottom of the column 56 and eventually leaves the body 30 via the outlet 44. From the outlet 44, the polymer solution may be conveyed to a storage tank or directly to the point of use.

The inlet port 40, which is hooded by the cyclone footing 94, provides an inlet for the air needed so that jets from the nozzles 60 can create an accelerated downward flow through the column 56. As a result of the accelerated downward flow, excess air is pulled into the body 30 through the bottom of the column 56 and an elevated pressure may result. The excess air may be discharged through the air outlet slot 36 provided at the top of the body 30. Excess air could also be discharged through the auxiliary air outlet 46 or that outlet could be closed during operation.

If, for some reason, some dust does become airborne and is carried to the upper regions of the body 30, the escape of such dust to the atmosphere could be prevented by closing the air outlet slot 36 and drawing all excess air from the body through the auxiliary air outlet 46. This could be accomplished by means of an aspirator 130 as shown in FIG. 11. In the aspirator, the air, including airborne dust, could be combined with water supplied through a line 132. The dust would become wetted and the air-liquid mixture could be discharged in an environmentally acceptable manner or be carried in the line 134 to a point where the air-liquid mixture is combined with a solution of liquid polymer at a location downstream of the outlet 44. Further downstream, separation means (not shown) would be provided for separating air from the polymer solution.

Also, as shown in FIG. 11, some reduction in dusting can be accomplished by including a deflection plate 138 inside the body 130 at a location below the column 56. This plate may be generally conical and freestanding as illustrated and could be surrounded by a housing (not shown). Such a deflection device creates radial flows of polymer solution that substantially fill the entire cross-sectional area of the lower portion of the body to provide a trap for dust. In addition, impact of the polymer solution with such deflection plate spreads the stream of solution and slows its vertical movement so that entrained air is released from the solution to escape upwardly inside the body 30.

Figure 15:
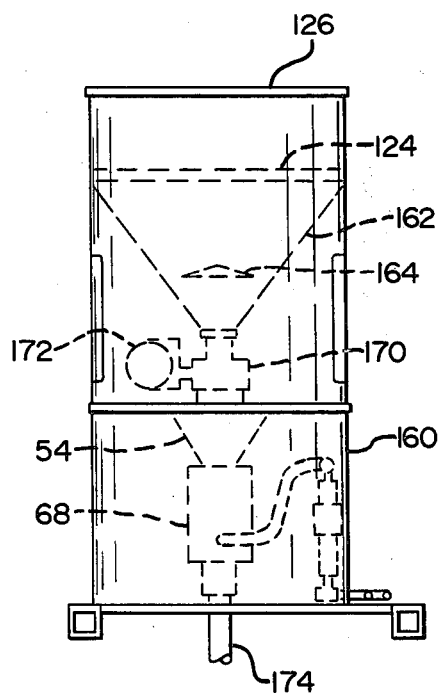
FIG. 15 is an elevational view showing an alternate embodiment of the apparatus shown in FIGS. 1-11.
Figure 16:
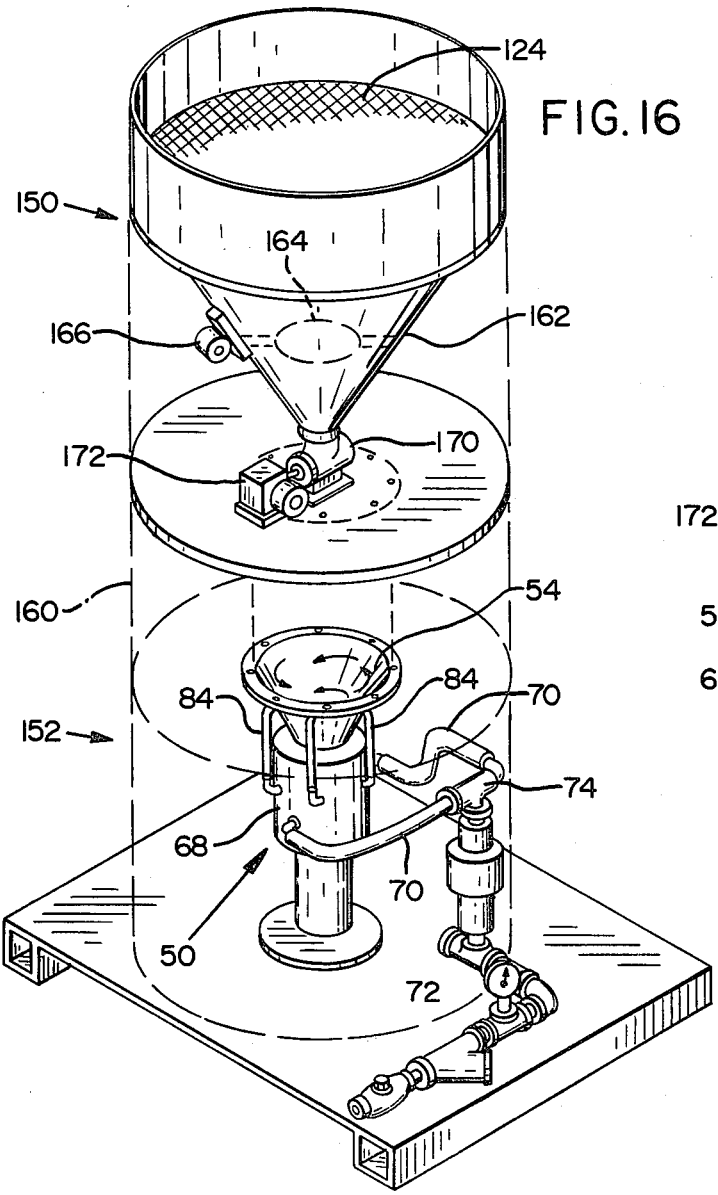
FIG. 16 is a partially exploded perspective showing interior details of the apparatus of FIG. 15.
Figure 12:
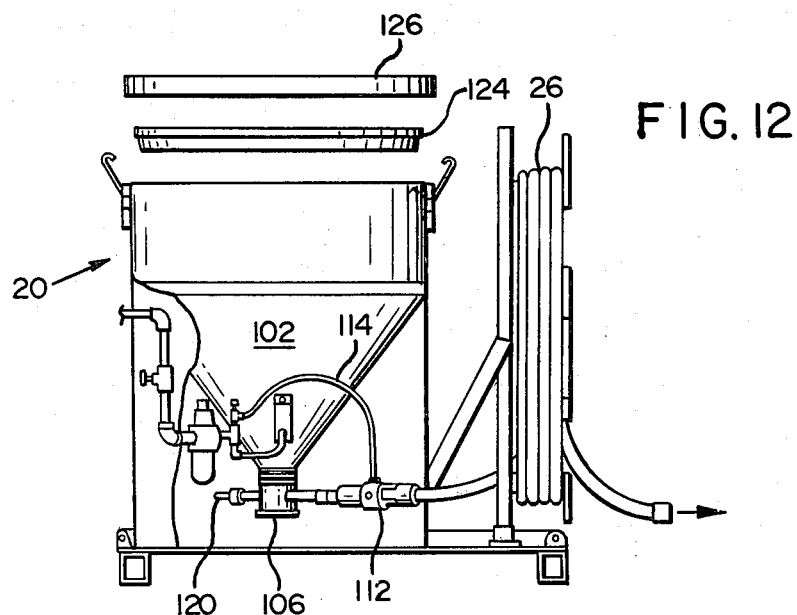
FIG. 12 is a more detailed and partially exploded, elevational view of the hopper apparatus shown in FIG. 11.
Figure 13:
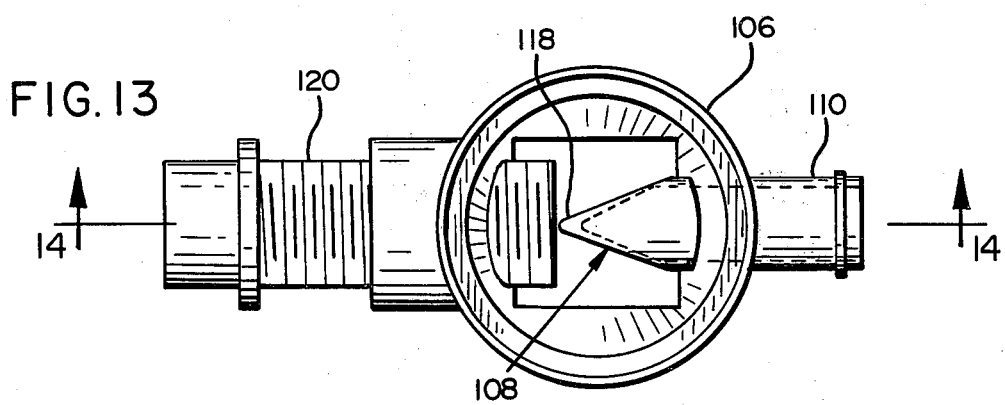
FIG. 13 is an enlarged plan view of apparatus for receiving powdered or granular material from the hopper illustrated in FIG. 12.
Figure 14:
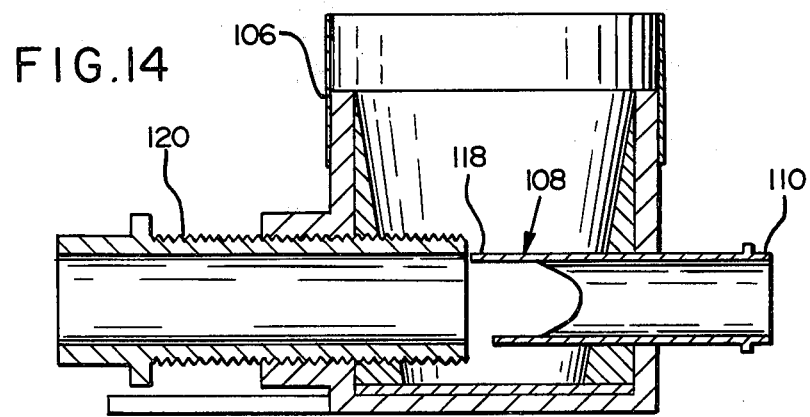
FIG. 14 is a sectional view taken along line 14—14 of FIG. 13.

A second, more compact embodiment of the invention is illustrated in FIGS. 15 and 16. This embodiment includes a feed hopper 150 and a wetting unit 152 which are stacked inside a unitary, substantially airtight body 160.

Features of the apparatus shown in FIGS. 15 and 16, which are analogous to features previously described, bear the same reference numerals. The wetter assembly 50 is quite similar to the wetter assembly described in conjunction with previous figures and is numbered accordingly. The feed hopper 150 is, however, somewhat different. Specifically, it includes a conical bin 162 which includes a concentric interior baffle 164. Polymer can become compressed at the bottom of the bin 162 due to the weight of the overlying material and normal settling. The baffle 164 prevents undue compression at the bottom of the bin 162. A vibrator 166 may be provided to shake the bin 162 and thereby encourage downward flow of polymer during operation of the wetter.

Polymer is delivered form the base of the bin 162 to the funnel 54 by means of a star wheel volumetric feeder 170 driven by a motor 172. The feeder 170 is adjusted by regulating the motor speed to deliver a desired metered flow of a polymer powder into the wetter assembly 50 where it is combined with a metered amount of liquid. Since the entire apparatus is contained within the body 160, no dust can escape from inside the wetting apparatus.

The polymer solution produced in the apparatus is carried through a discharge tube 174 to a mixing tank (not shown) which may be located at any convenient position. When needed the polymer solution may be pumped from that tank to the specific site of use.

Because the apparatus of FIGS. 15 and 16 is intended for continuous operation in a corrosive environment where explosive gas fumes or airborne powder may be present, no electrical components are used in the apparatus. The hopper vibrator 166 and motor 172 are air powered. Liquid flow controlling apparatus is self-actuated by water pressure opposing internal springs; and operating controls comprise manually operated valves for the water supply and compressed air. Corrosion-resistant plastics and alloy metals are used in construction of the unit. All metal components are connected by grounding wires to each other and to a positive ground on the job site to drain static charges.

To operate the unit of FIGS. 15 and 16, the bin 172 is loaded with dry particulate material, e.g. polymer. The water supply valve is then opened, starting a flow of water through the wetter assembly 50. When water flow is established, a compressed air supply valve (not shown) is opened, starting the hopper vibrator 166 and volumetric feeder motor 172. Immediately, dry material is fed into the assembly 50.

Solution strength is determined solely by the speed of the volumetric feeder 170 while liquid flow is maintained at a constant rate. The feeder speed adjustment is manually set by an air flow needle valve and pressure regulating valve (not shown) present in the air supply line to motor 172.

To prevent inadvertent feeding of powdered material into the funnel 154 when the water supply is off, an air supply cut-off valve (not shown) may be provided. Such a valve would be held open by supply water pressure and installed in such a position that when the supply water is interrupted, the air supply cut-off valve would stop the flow of air to the vibrator 166 and motor 172. This would prevent any inadvertent clogging of the wetter assembly 50 due to an inadvertent operator error or accidental loss of water supply pressure.

While we have shown and described preferred embodiments of our invention, it will be apparent to those skilled in the art that changes and modifications may be made without departing from the invention in its broader aspects. The appended claims are therefore intended to cover all such changes and modifications as fall within the true spirit and scope of our invention.

We claim:

1. An apparatus for wetting a particulate material for forming a homogeneous solution and/or mixture comprising:
feed means for producing a freely falling column of particulate material to be wetted;
a generally vertical wetter column having an inlet, terminating at an outlet at the bottom and having, between said inlet and outlet, an interior surface which:
  a. surrounds and is spaced outwardly from said falling column,
  b. has openings to receive a plurality of nozzles, and
  c. defines an unconstricted spray contact region that is free of obstructions which would reverse the downward flow of fluids in said wetter column;
a plurality of nozzles located below the feed means and within said spray contact region, said nozzles being generally in a single helix array and being located to produce liquid jets each of which:
  a. extends inwardly away from said surface at an angle not above horizontal, and
  b. is directed to shear said falling column without reversing the generally downward flow through said region, the number of nozzles and the amount of liquid flow therethrough being sufficient that particulate material is wetted completely as said material in said falling column falls into and is sheared by jets in said spray contact region; and means for providing pressurized liquid to said nozzles.

2. Apparatus of claim 1 further comprising means for continuously washing said interior surface.

3. Apparatus of claim 1 wherein said feed means comprises a mechanical, volumetric feed device located directly above said wetter column, said device including an explosion resistant motor.

4. An apparatus for wetting a particulate material to form a homogeneous solution and/or mixture comprising:

a generally vertical wetter column defining an unobstructed spray contact region having a central vertical axis extending through said region;

at least three nozzles each located at a different circumferential position around said column, each located at a different elevation, and each being constructed to produce a fan-shaped wetting jet aimed radially inwardly toward said axis;

means for providing pressurized liquid to said nozzles to produce said jets; and feed means at the top of said column for producing a single free-falling column of particulate material at said axis.

5. An apparatus of claim 4 wherein each said nozzle is positioned to produce a downwardly directed jet.

6. An apparatus of claim 5 wherein:

said nozzles are located so that said jets at least partially intersect; and said means for providing pressurized liquid is constructed to supply liquid at such a pressure that an unwetted mass of particulate material carried by one of said jets to a line of intersection will be sheared by the intersecting jet with sufficient energy that said mass will disintegrate.

7. An apparatus of claim 1 or 4 wherein said for providing pressurized liquid is constructed to supply a liquid at such a pressure that jets produced by said nozzles will have sufficient velocity to disintegrate falling lumps of particulate material upon impact.

8. An apparatus for wetting a particulate material to form a homogeneous solution and/or mixture comprising:

a generally vertical wetter column;

a plurality of nozzles located on the interior of said column and arranged generally in a single helix array, each nozzle being adapted to produce an inwardly directed, fan-shaped wetting jet;

means for providing pressurized liquid to said nozzles; and feed means for feeding particulate material to be wetted into the top of said column.

9. Apparatus of claim 8 wherein said wetter column defines an interior spray contact region that is unobstructed.

10. An apparatus for wetting a particulate material to form a homogeneous solution and/or mixture comprising:

a generally vertical wetter column having a smooth interior surface;

a plurality of nozzles located on the interior of said column and arranged generally in a single helix array, each nozzle being adapted to produce an inwardly and downwardly directed, fan-shaped wetting jet;

means for providing pressurized liquid to said nozzles;

means for continuously washing the total area of said interior surface;

feed means for feeding particulate material to be wetted into the top of said column, said feed means comprising a mechanical, volumetric feed device located directly above said wetter column and an explosion assistant motor;

means to adjust said motor to regulate the rate of particulate material feeding; and means for holding and supplying said particulate material to said feed means.

11. An apparatus for wetting a particulate material for forming a homogeneous solution and/or mixture comprising:

feed means including a mechanical, volumetric feed device for producing a freely falling column of particulate material to be wetted, said feed device including an explosion resistent motor;

means for holding and supplying said particulate material to said feed means;

a generally vertical wetter column having an inlet terminating at an outlet at the bottom and having, between said inlet and outlet, a smooth, cylindrical interior surface which:

a. surrounds and is spaced outwardly from said falling column, b. has openings to receive a plurality of nozzles, and c. defines an unconstricted spray contact region which is free of restrictions which would reverse the downward flow of fluids in said wetter column and which has a central vertial axis located within the falling column;

a plurality of nozzles located below the feed means and within said spray contact region, said nozzles being generally in a single helix array and being constructed and located to produce liquid jets each of which:

a. is fan shaped, b. extends inwardly and downwardly toward said axis, away from said surface at a uniform angle from horizontal, c. is directed to shear said falling column without reversing the generally downward flow through said region, and d. is located to at least partially intersect another of said jets, the number and positioning of nozzles and the amount of liquid flow therethrough being such that a helical air passageway extends through said spray contact region between said jets, a downdraft is created inside the wetter column, and particulate material is wetted completely as said material in said falling column falls into and is sheaved by jets in said spray contact region;

manifold means for providing pressurized liquid to said nozzles at such a pressure that jets produced by said nozzles will have sufficient velocity to disintegrate falling lumps of particulate material upon impact and such that any unwetted mass of particulate material carried by one of said jets to a line of intersection will be sheared by the intersedting jet with sufficient energy that said mass will disintegrate; and means for continuously washing the total area of said interior surface and all portions of any nozzles which extend inwardly of said surface.

12. Apparatus of claim 1, 4, 8, 10 or 11 wherein said feed means comprises an apparatus for producing a continuous column of particulate material to be wetted.

13. Apparatus of claim 1, 4, 8, 10 or 11 wherein said feed means comprises an apparatus for producing a discontinuous column of particulate material to be wetted.

14. A process for wetting a particulate material to form a homogeneous solution or mixture comprising:
  feeding particulate material to be wetted so as to form a freely-falling column of particulate material within an unobstructed, generally vertical wetter column having an interior surface spaced outwardly from the column;
  causing said particulate material in said falling column to move downwardly in a stream through a single helix array of fan-shaped liquid jets that extend inwardly away from said surface at an angle not above the horizontal; and
  discharging wetted particulate material at the base of said array.

15. A process for wetting a particulate material to form a homogeneous solution or mixture comprising:
  feeding particulate material to be wetted so as to form a single, free-falling column of particulate material in an unobstructed spray contact region that has a central vertical axis and is defined by a wetter column wherein said material falls downwardly into a liquid spray pattern produced by at least three fan-shaped, liquid wetting jets, each of which is aimed radially inwardly toward said axis from a different circumferential position around said column and from a different elevation; and
  discharging wetted particulate material from the bottom of said column.

16. The process of claim 15 comprising:
  supplying liquid to said nozzles at sufficient pressure that any unwetted mass of particulate material falling through said wetter column is carried by one of said jets to a region where said mass is sheared by an intersecting jet with sufficient energy that said mass will disintegrate.

* * * * *

UNITED STATES PATENT AND TRADEMARK OFFICE
CERTIFICATE OF CORRECTION

PATENT NO. : 4,390,284  
DATED : June 28, 1983  
INVENTOR(S) : Paul E. Hyde et al.

It is certified that error appears in the above-identified patent and that said Letters Patent are hereby corrected as shown below:

ON THE TITLE PAGE:

In the Abstract:

Line 5, "fructoconical" should be --frustoconical--.

In the Title:

"Powder" should be --Dry Particulate Material--.

Column 1, lines 58-59, "solutions" should be --solution--.

Column 2, line 47, before "not", insert --may--.

line 58, "apparatus" should be --apparatus,--.

Column 11, line 41, after "said" insert --means--.

UNITED STATES PATENT AND TRADEMARK OFFICE
CERTIFICATE OF CORRECTION

PATENT NO. : 4,390,284

DATED : June 28, 1983

INVENTOR(S) : Paul E. Hyde Et Al.

It is certified that error appears in the above—identified patent and that said Letters Patent is hereby corrected as shown below:

Column 12, line 11, "assistant" should be --resistant--.

line 22, "resistent" should be --resistant--.

line 37, "vertial" should be --vertical--.

line 59, "sheaved" should be --sheared--.

lines 66-67, "intersedting" should be --intersecting--.

Signed and Sealed this

Eleventh Day of October 1983

[SEAL]

Attest:

GERALD J. MOSSINGHOFF

Attesting Officer

Commissioner of Patents and Trademarks